United States Patent

[11] 3,597,704

[72] Inventor Heinz Steinger
Langenthal, Switzerland
[21] Appl. No. 841,523
[22] Filed July 14, 1969
[45] Patented Aug. 3, 1971
[73] Assignee Hasler, AG
Bern, Switzerland
[32] Priority July 17, 1968
[33] Switzerland
[31] 10390/68

[54] RC BRIDGE VARIABLE FREQUENCY SINUSOIDAL OSCILLATOR
8 Claims, 3 Drawing Figs.

[52] U.S. Cl. .......... 331/140, 333/75
[51] Int. Cl. .......... H03b 5/26
[50] Field of Search .......... 331/110, 140, 141, 142; 333/70 R, 75

[56] References Cited
UNITED STATES PATENTS

| | | | |
|---|---|---|---|
| 2,927,282 | 3/1960 | Gardberg .......... | 331/110 X |
| 3,308,400 | 3/1967 | Cochran .......... | 333/75 |

*Primary Examiner*—Roy Lake
*Assistant Examiner*—Siegfried H. Grimm
*Attorney*—Brady, O'Boyle & Gates

ABSTRACT: A sinusoidal wave generator comprises an amplifier operating with feedback through an RC bridge network having a first and a second loop. One pole of the first loop is connected through a resistor or capacitor to one pole of the amplifier; the other two poles, being common to both loops, are connected together by a circuit element which may be a single-pole circuit breaker or a variable impedance. One pole of the circuit element is connected to a second pole of the amplifier. The aforesaid pole on the first loop is connected to the common poles by capacitors or resistors. One of the common poles is also connected to a pole on the second loop by a resistor and the other common pole to said pole by a capacitor.

PATENTED AUG 3 1971

3,597,704

Inventor:

HEINZ STEINGER

BY Brady, O'Boyle & Gates

ATTORNEYS

RC BRIDGE VARIABLE FREQUENCY SINUSOIDAL OSCILLATOR

The invention relates to a sinusoidal wave generator comprising an amplifier which operates with feedback through a RC network and which comprises a first pole and a second pole, one of which forms the amplifier input and the other the amplifier output, and has a reference pole, the internal resistance of the amplifier between the first pole and the reference pole being high and that between the second pole and the reference pole being low in relation to the resistance set up in the RC network between the pole concerned and the reference pole.

In a known sinusoidal wave generator of this kind, the amplifier is a voltage amplifier, of which the input and output voltages are cophasal. The first pole is the input of the amplifier, and the second pole is the output thereof. The RC network consists of a RC series connection and a RC parallel connection, which are connected in series with one another and form a voltage divider. This voltage divider lies between the second pole and the reference pole, and the RC parallel connection lies between the first pole and the reference pole. The voltage divider produces a voltage division without phase shift, i.e. the input and output voltages are in phase, for a frequency determined by its design. The amplification of the amplifier is at least equal to the reciprocal value of the dividing ratio of the voltage divider. The generator oscillates at a particular frequency. Usually, the two resistors and the two capacitors of the voltage divider are equal to one another, and for varying the frequency either the two capacitors or the two resistors are varied in common. In order that the dividing ratio of the voltage divider may remain constant the two resistors or the two capacitors must be varied to exactly the same extent. High requirements must be met in regard to the equal variation of the two resistors or the two capacitors, because deviations from the dividing ratio have the result that the amplitude also varies on variation of the frequency. The invention has for its object to overcome the difficulties thus arising and to provide s sinusoidal wave generator in which the frequency may be varied by variation of a single resistor or capacitor of the RC network, the voltage dividing ratio of the latter remaining constant.

In accordance with the invention, this is achieved by virtue of the fact that the RC network consists of impedances of a first kind and impedances of a second kind, the impedances of one of these two kinds being capacitors and those of the other kind being ohmic resistors, that a first impedance of the second kind is connected on the one hand to the second amplifier pole and on the other hand to one pole each of a first and a second impedance of the first kind, that the other pole of the first impedance of the first kind is connected to the reference pole through a third impedance of the first kind and the other pole of the second impedance of the first kind is connected to the reference pole through a second impedance of the second kind, and that the connection between the second impedance of the first kind and the second impedance of the second kind is directly connected to the first pole of the amplifier and is connected to the connection between the first and third impedances of the first kind through a circuit element.

The circuit element may be a single-pole circuit breaker, in which case one predetermined frequency is generated when the switch is in one position and another predetermined frequency is generated when the switch is in the other position. The circuit element may also be a variable impedance (resistance or capacitance), in which case the frequency of the sinusoidal wave generator may be varied by variation of this impedance.

Two embodiments of the invention will be more fully described in the following with reference to the accompanying drawings, in which.

Figure 1:
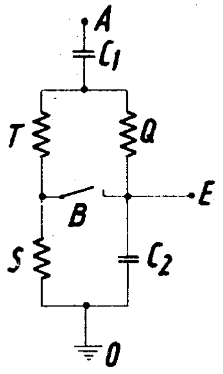
FIG. 1 illustrates a RC network for a sinusoidal wave generator.

The RC network according to FIG 1 is intended to be connected at the point A to the output pole, at the point E to the input pole and at the point 0 to the reference pole of a voltage amplifier, in which the input and output voltages are in phase, and of which the output impedance is low in relation to the impedance between A and O and whose input impedance is high in relation to the impedance between E and O of the network. The network is a voltage divider comprising two capacitors $C_1$ and $C_2$ and three resistors Q, S, T. Situated between the capacitor $C_1$ and the reference pole O are a series connection of the resistors T and S, and in parallel therewith a series connection of the resistor Q with the capacitor $C_2$. The point of connection of Q to $C_2$ is connected to the point of connection of T to S through a single-pole circuit breaker B and forms the output pole E of the voltage divider. If, for example $C_1=C_2$, $Q=\frac{1}{2}(3+\sqrt{5})\,S=$ about 2.62 $S$, $T=\frac{1}{2}(1+\sqrt{5})\,S=$ about 1.62 S, then the angular frequency with the switch closed is $$W_0=\frac{1}{C_1\cdot S}$$

and with the switch open it is $$W_{00}=\frac{1}{2.62\cdot C_1\cdot S}=\frac{W_0}{2.62}$$

If $C_1=C_2$, a changeover is possible between two frequencies for voltage division, independent of the position of the switch, with no phase shift, even under other conditions for $S$, $T$ and $Q$. Calculation shows that the resistance of the equation must satisfy:

$$T^2=Q\cdot S$$

The ratio of the two frequencies is dependent upon the ratio $Q/S$.

This possibility of changeover between two different frequencies with constant voltage divider ratio also exists when $C_1\neq C_2$. The condition which the resistors $T$, $Q$ and $S$ have to satisfy in this case is given by the following equation:

$$\frac{1+T/S}{1+Q/T}=\frac{C_2}{C_1} \qquad \text{Equation 1}$$

If we postulate $C_2/C_1=K$ and the ratio of the resultant resistance of the parallel connection of $T$ and $Q$ with the resistance $S$:

$$\frac{T\cdot Q}{(T+Q)S}=N \qquad \text{Equation 2}$$

the voltage divider ratio is calculated as follows.

$$V=1+K+N$$

$W_o$ and $W_{oo}$ are dependent upon $C_1$, $S$, $K$ and $N$ and the ratio $W_o/W_o$ only upon $K$ and $N$.

With equations 1 and 2, $T$ and $Q$ can be calculated with given $K$, $N$ and $S$.

It may furthermore be shown by calculation that, if the switch B in FIG. 1 is replaced by a variable resistor P (FIG. 2), the in-phase voltage divider ratio is constant for all values of the resistor P if the resistors $T$ and $Q$ are chosen in accordance with the criteria just described. Consequently, the frequency of the generator is constantly variable between the two aforesaid values $W_o$ and $W_{oo}$. The possible range of the variation increases as N increases, but $N$ will not be made too high in order that the resistance $S$ on the one hand and the resistances $T$ and $Q$ on the other hand may not differ too greatly.

Figure 3:
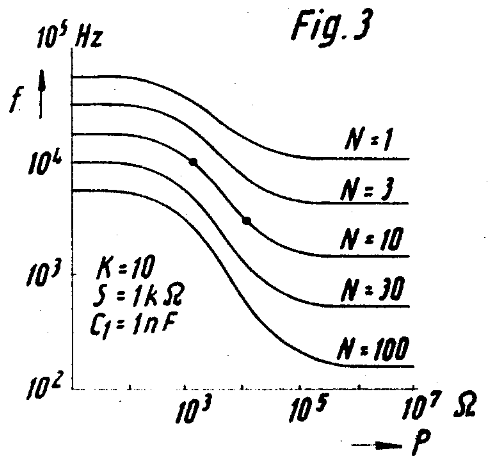
FIG 3 is a graphic illustration of the dependence of the frequency of a generator with the RC network according to FIG. 1 upon the value of the network.

In FIG. 3, the frequency is indicated as an example of a particular ratio of $C_2$ to $C_1$ and for various parameters $N$. Generally, the ratio of the frequency limits of the generator will first be chosen, suitable values will be selected for $K$ and $N$ from a set of curve families, of which one is shown in FIG. 3, and $C_1$ and $S$ will then be determined, whereby the resistances $T$ and $Q$ will thus also be decided.

For example, the following combination of resistors and capacitors is possible:

$S=1\,k\Omega$
$T=19.51\,k\Omega$
$Q=20.51\,k\Omega$
$C_1=1$nf.
$C_2=10$nf.
$K=10$
$N=10$
$P$ for 10 kc./s. = about $1.5\,k\Omega$
$P$ for 5 kc./s. = about $15\,k\Omega$
$V=21$ The two frequencies are indicated in FIG. 5 by small circles.

It can furthermore be shown by calculation that in the specific case where $C_1=C_2$ the frequency change may also be effected by varying the resistance, the resistors $Q$, $S$ and $P$ having to satisfy the equation $$P^2=Q\cdot S$$

For $C_1\neq C_2$, however, the resistor $P$ must be variable in order that a voltage-dividing ratio independent of frequency may be obtained.

A particularly simple form of circuit arrangement is obtained for a generator whose frequency is adjustable only within narrow limits about a desired frequency $W_1/2\pi$, when $C_1=C_2$ and the resistances $S$ and $Q$ and $P$ or $T=1/W_1C$ and the residual resistance $T$ or $P$ is variable between values somewhat above and below $1/W_1C$. The voltage dividing ratio $V$ in this case is 1:2.5 and $W_o/W_{oo}=2$.

Figure 2:
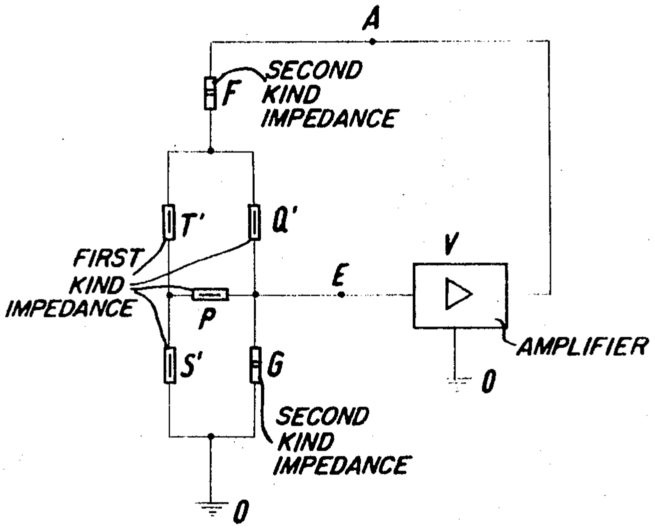
FIG. 2 illustrates a sinusoidal wave generator with another RC network.

Finally, it can be shown by calculation that in all the aforesaid circuit arrangements resistors and capacitors may be interchanged in such manner that a fixed capacitor is replaced by a fixed resistor, a fixed resistor by a fixed capacitor and a variable resistor by a variable capacitor. In FIG. 2, there is illustrated a sinusoidal wave generator comprising an amplifier V and a network containing four impedances of the first kind $T'$, $Q'$, and $S'$, $P$ and two impedances of the second kind $F$ and $G$. The impedances of the first kind are represented by the impedance symbol with a longitudinal stroke, and the impedances of the second kind by the impedance symbol with two transverse strokes. The impedances of one of the two kinds are resistors and those of the other kind are capacitors. Since the impedance of a capacitor is inversely proportional to its capacitance, the following equation is generally substituted for equation 1:

$$\frac{1+T'/S'}{1+Q'/T'}=\frac{F}{G}$$

When $F$ is equal to $G$, the equations indicated for $C_1=C_2$ remain unchanged, impedances being substituted for the resistors.

It has been assumed in connection with FIGS. 1, 2 and 3 that the amplifier is a voltage amplifier, but it may also be a current amplifier, in which case the point A must be connected to the input and the point E to the putout of the amplifier, and the RC network acts as a current divider.

The amplifier may also be a differential amplifier (voltage or current amplifier) having connected to its second input the output of a frequency-independent voltage divider or current divider consisting, for example, of 2 ohmic resistances and fed by the amplifier output.

The variable resistor or capacitor may be adjusted either manually or by means of a control quantity (for example voltage, current, temperature, pressure). It is thus readily possible to construct a frequency-regulated, frequency-modulated or frequency-keyed transmitter of relatively high frequency and amplitude constancy. In the case of a frequency-regulated or frequency-modulated generator, the operation will take place in the descending part of the curves according to FIG. 3, while for frequency shift keying it is desirable to effect the changeover between the two horizontal parts of a curve in order to obtain high frequency accuracy.

In the case of frequency shift keying, it is particularly advantageous that no sudden amplitude changes occur.

I claim:

1. Sinusoidal wave generator comprising an amplifier operating with feedback through a RC network and comprising a first pole and a second pole, of which one forms the amplifier input and the other the amplifier output, and a reference pole, the internal resistance of the amplifier between the first pole and the reference pole being high, and that between the second pole and the reference pole being low in relation to the resistance set up in the RC network between the pole concerned and the reference pole, characterized in that the RC network consists of impedances of a first kind and impedances of a second kind, the impedances of one of these two kinds being capacitors and those of the other kind being ohmic resistors, in that a first impedance of the second kind (F) is connected on the one hand to the second amplifier pole (A) and on the other hand to one pole each of a first impedance (T') and of a second impedance (Q') of the first kind, in that the other pole of the first impedance of the first kind (T') is connected through a third impedance of the first kind (S' ) and the other pole of the second impedance of the first kind (Q') is connected through a second impedance of the second kind (G) to the reference pole, and in that the connection between the second impedance of the first kind (Q') and the second impedance of the second kind (G) is directly connected to the first pole (E) of the amplifier and is connected to the connection between the first impedance (T') and the third impedance (S') of the first kind through a circuit element B or P.

2. Generator according to claim 1, characterized in that the amplifier is a voltage amplifier whose input forms the first pole and whose output forms the second pole.

3. Generator according to claim 1, characterized in that the amplifier is a current amplifier whose input forms the second pole and whose output forms the first pole.

4. Generator according to claim 1, characterized in that the following relation exists between the aforesaid impedances $$\frac{1+T'/S'}{1+Q'/T'}=\frac{F}{G}$$

where $T'$ denotes the first impedance of the first kind, $Q'$ denotes the second impedance of the first kind and $S'$ denotes the third impedance of the first kind, while $F$ denotes the first impedance of the second kind and $G$ denotes the second impedance of the second kind.

5. Generator according to claim 4, characterized in that the circuit element is a single-pole switch (B) serving for the frequency changeover.

6. Generator according to claim 4, characterized in that the circuit element is a fourth impedance (P) of the first kind which is variable for the frequency change.

7. Generator according to claim 1, characterized in that the circuit element is a fourth impedance (P) of the first kind, the first impedance (T') of the first kind is variable for the frequency change, the two impedances of the second kind have the same value (F=G), and the following relation exists between the second, third and fourth impedances of the first kind $$P^2=Q'S'$$

where Q' denotes the second impedance of the first kind, S' denotes the third impedance of the first kind and P denotes the fourth impedance of the first kind.

8. Generator according to claim 6, characterized in that the variable impedance is variable by physical means.